(12) United States Patent
Patel et al.

(10) Patent No.: US 8,569,398 B2
(45) Date of Patent: Oct. 29, 2013

(54) JETTABLE COMPOSITIONS

(75) Inventors: Ranjana C. Patel, Little Hallingbury (GB); Yong Zhao, Cambridge (GB); Richard John Peace, Putnoe (GB)

(73) Assignee: 3D Systems, Inc., Rock Hill, SC (US)

( * ) Notice: Subject to any disclaimer, the term of this patent is extended or adjusted under 35 U.S.C. 154(b) by 657 days.

(21) Appl. No.: 12/964,083

(22) Filed: Dec. 9, 2010

(65) Prior Publication Data

US 2011/0082238 A1   Apr. 7, 2011

Related U.S. Application Data

(63) Continuation of application No. 12/637,212, filed on Dec. 14, 2009, now Pat. No. 7,871,556, which is a continuation of application No. 10/515,793, filed as application No. PCT/GB03/02273 on May 23, 2003, now Pat. No. 7,655,174.

(30) Foreign Application Priority Data

May 24, 2002 (GB) .................................. 0212062.4

(51) Int. Cl.
| | |
|---|---|
| A61K 9/16 | (2006.01) |
| B05D 1/32 | (2006.01) |
| B29C 35/04 | (2006.01) |
| B29D 11/00 | (2006.01) |
| B41J 2/01 | (2006.01) |
| B41J 2/175 | (2006.01) |
| C03C 25/10 | (2006.01) |
| C07D 303/40 | (2006.01) |
| C08F 2/00 | (2006.01) |
| C08F 283/10 | (2006.01) |
| C08G 18/67 | (2006.01) |
| C08G 59/14 | (2006.01) |
| C08G 65/18 | (2006.01) |
| C08G 67/02 | (2006.01) |
| C09D 5/00 | (2006.01) |
| C09D 11/00 | (2006.01) |
| G01D 11/00 | (2006.01) |
| G03F 7/00 | (2006.01) |
| G03C 1/00 | (2006.01) |

(52) U.S. Cl.
USPC .............. 523/160; 264/401; 347/1; 347/95; 347/100; 427/466; 430/270.1; 430/280.1; 430/285.1; 430/281.1; 522/90; 522/92; 522/96; 522/100; 522/168; 522/170; 522/178; 522/186; 523/161; 524/543; 524/612

(58) Field of Classification Search
USPC ............ 264/401; 427/466; 430/270.1, 280.1, 430/285.1, 281.1; 522/90, 92, 96, 100, 168, 522/170, 178, 186; 523/160, 161; 524/543, 524/612; 347/1, 95, 100
See application file for complete search history.

(56) References Cited

U.S. PATENT DOCUMENTS

| | | |
|---|---|---|
| 5,889,084 A | 3/1999 | Roth |
| 6,099,787 A | 8/2000 | Melisaris et al. |
| 6,232,361 B1 | 5/2001 | Laksin et al. |
| 2002/0008333 A1 | 1/2002 | Napadensky et al. |
| 2002/0132872 A1 | 9/2002 | Yamamura et al. |
| 2004/0142274 A1 | 7/2004 | Thies et al. |

FOREIGN PATENT DOCUMENTS

| | | |
|---|---|---|
| EP | 0071345 | 2/1983 |
| EP | 0848294 | 6/1998 |
| EP | 0997507 | 5/2000 |
| EP | 0997508 | 5/2000 |
| JP | 2001220526 | 8/2001 |
| JP | 2003-026775 | 1/2003 |
| WO | WO 9929788 | 6/1999 |
| WO | WO 0034400 | 6/2000 |

OTHER PUBLICATIONS

Patent Abstracts of Japan, vol. 2000, No. 25, Apr. 12, 2001.

*Primary Examiner* — Patrick Niland

(57) ABSTRACT

A fully curable jettable composition having a viscosity less than 30 cps at a temperature within the range of 15° C.-180° C. comprising (i) at least one low viscosity reactive resin; (ii) at least one higher viscosity resin having a viscosity greater than twice that of the low viscosity resin and a functionality of greater than or equal to 2; (iii) at least one curable toughener, (iv) at least one initiator for the polymerization of the resins, and (v) at least one stabilizer for delaying the curing of the resins of the composition. The composition can be jetted from piezo electric printing heads under the control of a computer program to form a multi-layered article, for example, a three dimensional article, in which the adjacent droplets merge and are cured homogeneously together.

8 Claims, 3 Drawing Sheets

JETTABLE COMPOSITIONS

CROSS REFERENCES TO RELATED APPLICATIONS

This application is a continuation application of U.S. patent application Ser. No. 12/637,212, filed on Dec. 14, 2009, now U.S. Pat. No. 7,871,556, which is a continuation of U.S. patent application Ser. No. 10/515,793, filed on Nov. 22, 2004, now U.S. Pat. No. 7,655,174, filed as application No. PCT/GB03/02273 on May 23, 2003 which designated the U.S. and was published in English and which claims priority to G.B. Pat. App. No. 0212062.4 filed May 24, 2002. The noted applications are incorporated herein by reference.

TECHNICAL FIELD

The present invention relates to curable compositions that can be deposited by jet printing or jet deposition techniques.

BACKGROUND ART

Jet deposition is a well-known technique for use in printing individual jobs or short print runs; printing heads direct droplets of liquid ink, usually under the control of a computer, at a substrate. As used herein, the term "jet deposition" of a composition is intended to mean the dropwise deposition of the composition onto a predetermined location on a substrate to build up a two dimensional image or a three dimensional object in accordance with data stored in a computer file, e.g. a CAD design.

Early jet deposition heads were based on bubblejet technology and were limited to using aqueous inks. Aqueous inks require time to dry and this factor limits their application; also, the need to provide for space where the drying takes place limits the maximum rate at which printing can take place.

More recently piezoelectric jet printer heads have become commercially available and allow the use of photo or heat curable organic inks. It is therefore possible to cure a deposit immediately after it is formed, e.g. using a UV lamp to bring about photocuring. This eliminates the need to dry the ink and so increases production speed in conventional two dimensional printing. Curing also allows the use of jet deposition to manufacture three dimensional articles since it is possible to deposit droplets in successive layers to build up an object of a desired shape under the control of a computer program. Jet deposition has substantial advantages in being able to produce a wide variety of differently shaped deposits by changing the controlling computer file and so is relatively quick and cheap to set up and to switch from one image or object to another. It is therefore well suited for on-demand printing of single articles or short print runs.

Jetting successive layers to build up three dimensional objects is useful in the production of prototypes during product development or for short run production since it is possible to produce three dimensional objects more rapidly using these techniques as compared to known techniques, for example injection moulding where the manufacture of the mould is highly time consuming.

Recent techniques such as micro-spraying also allow the use of curable organic liquids to form two dimensional images and three dimensional articles; micro-spraying produces directed sub-droplets formed from directed droplets that are subjected in flight to acoustic waves which break up the droplets into even finer sub-droplets, see for example U.S. Pat. No. 6,182,907 (Mitsubishi Corporation) and U.S. Pat. No. 6,309,047 (Xerox Corporation).

However, there are several constraints on the types of compositions that can be used in jet deposition. One requirement is that the surface tension should be less than about 40 dynes/cm. A further important requirement is that, at deposition temperature, the composition should have a viscosity of approximately 2-30 cps. Unfortunately many curable compositions that can provide desirable final properties also have high viscosities and are therefore difficult to jet. There have been several proposals to reduce the viscosity of curable compositions to allow them to be jetted.

The viscosity of the composition can be reduced to the above range by jet deposition at temperatures above room temperature, for example temperatures up to and over 100° C., e.g. 65-75° C. are straightforward to use. Indeed, temperatures of up to 180° C. are possible with certain technologies, e.g. PolymerJet™ available from MicroFab Technologies Inc., Plano, Tex., U.S.A.

It has also been proposed to deposit phase change compositions, e.g. waxes, that are liquid at a jetting temperature (e.g. 65-75° C.) but solidify at room temperature. In this way three dimensional deposits have been built up. However, wax is not a robust material and the phase change inks have very limited application. There have been proposals to incorporate a curable material into a wax (see for example U.S. Pat. No. 5,855,836), but this is of only limited benefit.

Another proposal to reduce the viscosity of jettable curable compositions is to add a volatile diluent to the composition. However, the use of volatile solvents that evaporate after deposition is not desirable for health and safety reasons since the solvent gives rise to a fire hazard and can be damaging to the health of anyone inhaling substantial quantities of the solvent. Formulations involving solvents also do not yield the required final properties.

Acrylic compositions can be made having a low viscosity and are radiation curable and they have been widely investigated and are becoming increasingly common in the graphics art industry due to their rapid drying and solvent-free properties. Despite the low viscosity and fast curing rate of acrylate-based inks, the bulk properties of these inks are generally unsuitable for many applications, including the building up three dimensional objects, since acrylate polymers are brittle and shrink on curing. In addition, low viscosity acrylates can be irritants and therefore need careful handling.

WO00/23521 discloses a compounded polyester resin including both a high and low viscosity polyester. EP0848949 discloses a stereolithography composition containing an oxetane, an epoxy and a hydroxy-containing compound, e.g. tetrahydrofuran. However, neither specification discloses the use of the composition for jetting.

U.S. Pat. No. 4,195,148 discloses a method of preparing polyurethane using a lactone as a viscosity modifier. GB-2011931 discloses a water-soluble paint binder comprising a polyester resin modified with a polysiloxane and a carboxy group-containing film-forming resin.

EP0375332 discloses a mixture of a high viscosity methyl cellulose and a low viscosity methyl cellulose, which is useful as a binder and thickener in adhesive compositions.

DE19554327 discloses an aqueous composition for coating paper. U.S. Pat. No. 4,986,850, WO00/34400, EP0071345, U.S. Pat. No. 5,889,084 disclose jettable printing inks that contain water or a volatile solvent.

JP-A-2002 317139 discloses an oxetane-based radiation-curable ink for ink jet printing under humid conditions tough coatings. JP-A-2001 220526 describes a jettable ink containing compounds having an oxetane ring.

WO99/29788 (Xaar Technology Ltd) discloses a radiation curable jettable printing ink that includes a mixture of mono-, di- and tri-functional acrylates for printing on paper and plastics.

There is a continuing and increasing need to provide a composition that can be rapidly cured and that avoids the brittleness and shrinkage problems of acrylate resins and so allows jet deposition to be used for making multilayer deposits, for example to make three dimensional objects by building up successive layers or to be used in printing, e.g. on demand in single copies or in short print runs, books, carpets, wall papers, large format images (e.g. posters and advertising hoardings) and floor tiles and other applications where scratch-resistant, tough, permanent, chemical resistant printed images are desired. The printed image is preferably of uniform thickness so that no part of the image stands proud of the rest of the image. Such jetting applications are within the scope of the present invention.

Curable compositions can also be used for the rapid manufacture of three dimensional objects since rapid curing allows the next layer to be deposited almost immediately afterwards to build up a three dimensional article (see e.g. WO01/68375, U.S. Pat. No. 6,259,962, WO00/52624 and WO00/76772). In producing three dimensional objects, it is important that the material from which the object is formed is highly cohesive since otherwise the object will fall apart and have little or no tensile strength. Thus individual droplets used to form the object should cohere to one another and, indeed optimally, it is desirable that the droplets should be joined seamlessly, i.e. the individual droplets are not discernible, in the final three dimensional object.

UV curable resins are well known in the field of stereolithography to make three-dimensional objects but the requirements for stereolithographic compositions are very different than those for application by jetting and also the curing environment is different in stereolithography as compared to jetting.

The present invention provides a jettable composition having improved combination of properties, especially a good combination of tensile strength and ductility, e.g. elongation at break and tensile modulus, while allowing a broad range of polymers and resins to be used, since the composition provide cohesion between adjacent deposited droplets.

DISCLOSURE OF INVENTION

According to the present invention, there is provided a fully curable jettable composition having a viscosity less than 30 cps at a temperature within the range of 15-180° C., more preferably at a temperature of 15-100° C., e.g. 60-80° C. the composition comprising:

(A) at least one low viscosity reactive resin selected from the group consisting of compounds containing an oxetane ring, cycloaliphatic epoxy resins, tetrahydrofurans and mono-functional (meth)acrylates, said resin having a molecular weight of not greater than 300 Daltons, e.g. 250 Daltons or less, and a viscosity at a temperature in the said range of less than 30 cps, e.g. 5 to 15 cps;

(B) at least one higher viscosity resin selected from the group consisting of epoxy resins, compounds containing an oxetane ring and acrylates, which resin acts to thicken the low viscosity resin and strengthen a jetted deposit of the composition, the higher viscosity resin having:

a viscosity greater than twice that of the low viscosity resin at the said temperature in the range stated above, and a functionality of greater than or equal to 2;

(C) at least one curable toughener, such as hydroxy, epoxy, acrylic or other reactive functionalised polymer/oligomer (e.g. derived by functionalizing poly(tetrahydrofuran), polycaprolactone, polycarbonate diol, or a dendrimeric polyol;

(D) at least one initiator for the polymerisation of the resins, and (E) at least one stabiliser for delaying the curing of the resins of the composition;

wherein the low viscosity resin is slower to react than the higher viscosity resin and acts to solvate the higher viscosity resin prior to curing and at least partly during curing and wherein at least 30% (more preferably at least 40%, e.g. at least 50%) of the components A and B are cationically curable resins.

Preferably the higher viscosity resin has a molecular weight at least 1.5 times (and more preferable at least twice) that of the low viscosity resin.

It is highly advantageous that the low viscosity resin is slower to react than the higher viscosity resin, i.e. either the polymerisation of the former is initiated after the polymerisation of the latter or progresses at a slower rate, so that unpolymerised/uncured low viscosity resin is still present while the higher viscosity resin is curing/polymerising since this allows the growing chains of the higher viscosity resin (and any unreacted higher viscosity resin monomer or oligomer) to remain mobile for as long as possible, thereby increasing the length of the resin chain as far as possible before gelling occurs. This also prevents stress from building up as the polymer chains are progressing. For example, by the time that 50% of the curable groups on the higher viscosity resin has polymerised, it is preferred that less than 10% of the low viscosity resin has polymerised and when 90% of the higher viscosity resin has polymerised, less than 75% of the low viscosity resin has polymerised.

In addition, the use of the solvating low viscosity resin allows the resin in adjacent deposited droplets to mix, thereby allowing the resin of the two droplets to polymerise with each other. This "stitches together" adjacent droplets making a more cohesive structure to the deposited object.

The low viscosity resin also maintains the viscosity of the composition at a level that allows it to be jetted. Obviously, the amounts of the various resins in the composition should be controlled so that the resin can be jetted at a temperature at which jet deposition can take place, which is generally up to 180° C. but more typically 60-90° C.

If two or more higher viscosity resins are used, preferably each reacts faster than the lower viscosity resins but it is within the scope of the present invention if the majority of the higher viscosity resins (i.e. at least 50% by weight) react faster than the lower viscosity resins so that they are solvated by the lower viscosity resin(s) prior to curing and at least partly during curing. Likewise if two or more lower viscosity resins are used, preferably each reacts slower than the higher viscosity resin(s) so as to provide the function of solvating the higher viscosity resin(s); however, it is still within the scope of the present invention if two or more lower viscosity resins are present and at least one is present in sufficient quantity (e.g. at least 50%) that it provides the above solvating properties.

The composition is fully curable, that is to say substantially all the components of the composition or their reaction products are retained in the cured composition; thus the composition is substantially free from volatile materials that evaporate off during or after curing. And is substantially non-aqueous.

The low viscosity resin preferably has a viscosity at the jetting temperature, e.g. 20 to 100° C., of less than 75% of the viscosity of the higher viscosity resin, more preferably not greater than 50%, e.g. not greater then 40% of the viscosity of the higher viscosity resin.

The solvating, fully curable compositions of the present invention are particularly suitable for achieving multi-variable composites, where adjacent drops and printed areas are made from different jetted compositions: for example, simply by keeping the solvating low viscosity resin, essentially the same, but varying the second higher viscosity resin, which is used to provide different mechanical, textural, water/chemical resistant and other desired properties can be achieved in the final cured article, gives a route to varying the micro and macro properties in the final article. This is not possible using conventional techniques of bulk mixing and curing. This route leads surprisingly to greater variety of properties being produced more readily. This is exemplified by keeping an oxetane as the low viscosity resin, and varying the higher viscosity resin/toughener combination Low Viscosity Resin (Component A)

The possible ingredients of Component A are one or more of the following:

A1) oxetanes,

A2) cycloaliphatic epoxies (e.g. 4-vinyl-1-cyclohexene diepoxide, 4-vinyl-1,2-cyclohexene 1,2-epoxide and Cyracure UVR6100), optionally together with a lesser amount of an aliphatic glycidyl epoxide with a molecular weight of less than 200, e.g. 1,4-diglycidyl butane diol and epoxyhexane.

A3) tetrahydrofurans (e.g. 2-hydroxyethyl-tetrahydrofuran)

A4 mono-functional acrylates optionally together with a di-functional acrylate (e.g. butane-diol-diacrylate, hexane-diol-diacrylate, neopentyl-diol-diacrylate).

These ingredients will now be described in greater detail:

Oxetane (Component A1)

The oxetane compound of the present invention is a compound having one or more oxetane rings that can be polymerized or crosslinked by radiation from light in the presence of a cationic photo-initiator.

The oxetane compound may contain more than one oxetane rings, although preferably it contains only one oxetane ring.

Preferably, the oxetane compound has the structure of formula (I):

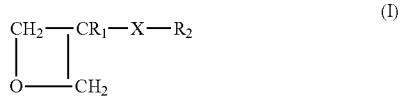
(I)

in which X is oxygen and in which:

$R_1$ represents a hydrogen atom or an aliphatic, cycloaliphatic or aromatic group, for example $C_{1-10}$ alkyl, e.g. methyl, ethyl, propyl, butyl, 2-ethyl-hexyl; a halogen-substituted $C_{1-10}$ alkyl; an aryl group having from 6 to 18 carbon atoms such as a phenyl group, naphthyl group; or a heterocyclic group, e.g. furyl group, or thienyl group, and $R_2$ represents a hydrogen atom, or an aliphatic, cycloaliphatic or aromatic group, e.g. $C_{1-10}$ alkyl group that is optionally substituted by one or more of halide, $C_{1-10}$ alkoxy or $C_{1-10}$alkoxysilylalkoxy, e.g. methyl, ethyl, propyl, butyl or triethoxysilylpropoxymethyl; $C_{2-10}$ alkenyl group e.g. 1-propenyl, 2-propenyl, etc.; aryl having from 6 to 18 carbon atoms and that is optionally substituted by one or more of halide, alkyl or alkoxy, e.g. phenyl, fluorophenyl, or naphthyl; aralkyl having from 7 to 18 carbon atoms and that is optionally substituted by one or more of halide, alkyl or alkoxy, e.g. benzyl, fluorobenzyl, methoxybenzyl, phenylethyl, etc; other aromatic groups, e.g. aryloxyalkyl group; $C_{2-6}$ alkylcarbonyl; $C_{2-6}$alkoxycarbonyl group; or a group of the formula (II) or (III):

or $R_2$ can stand for a group of the formula (II) or (III)

(II)

where $R_1$ is as defined above; or

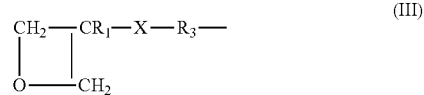
(III)

where X and $R_1$ is as defined above and $R_3$ represents a $C_{1-6}$ alkylene, or a phenyl, alkylphenyl or alkylphelylalkyl group optionally substituted by one or more of halide, alkyl or alkoxy group.

Specific examples of oxetanes are: 3-ethyl-3-hydroxymethyloxetane, 3-ethyl-3-phenoxymethyloxetane, bis((1-ethyl (3-oxetanyl))methyl)ether, 3-ethyl-3-((2-ethylhexyloxy)methyl)oxetane and 3-ethyl-((triethoxysilylpropoxymethyl) oxetane, 3-(meth)-allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethylhexyl(3-ethyl-3-oxetanylmethyl)ether, ethyldiethylene glycol (3-ethyl-3-oxetanylmethyl)ether, dicyelopentadiene (3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether.

3-Ethyl-3-hydroxymethyloxetane is particularly desirable as it has very low viscosity, is compatible with a range of higher viscosity reactive resins and is slower to react than e.g. acrylic and cycloaliphatic epoxy resins.

Cycloaliphatic Epoxides (Component A2),

Cycloaliphatic epoxides are compounds in which the epoxide groups foam part of an alicyclic or heterocyclic ring system, e.g. containing a 2,3-epoxycyelopentyl or 3,4-epoxycyclohexyl ring. Examples of such cycloaliphatic epoxide compounds include: 4-vinyl-1-cyclohexene diepoxide, 4-vinyl-1,2-cyclohexene 1,2-epoxide, Cyracure UVR6100 (which is a commercially available mixture of cycloaliphatic epoxides), bis(2,3-epoxycyclopentyl)ether, 2,3-epoxycyclopentyl glycidyl ether, 1,2-bis(2,3-epoxycyclopentyloxy) ethane, bis(4-hydroxycyclohexyl)methane diglycidyl ether, 2,2-bis(4-hydroxycyclohexyl)propane diglycidyl ether, 3,4-epoxycyclohexyl-methyl 3,4-epoxycyclohexanecarboxylate, 3,4-epoxy-6-methyl-cyclohexylmethyl 3,4-epoxy-6-methyl-cyclohexanecarboxylate, di(3,4-epoxycyelohexylmethyl) hexanedioate, di(3,4-epoxy-6-methylcyclohexylmethyl) hexanedioate, ethylene-bis(3,4-epoxycyclohexane)-carboxylate, ethanediol di(3,4-epoxycyclohexylmethyl)ether, vinylcyclohexene dioxide, dicyclopentadiene diepoxide or 2-(3,4-epoxycyclohexyl-5,5-spiro-3,4-epoxy)cyclohexane-1,3-dioxane.

Component A2 can optionally contain a lesser amount (i.e. less than 50% by weight) of an aliphatic glycidyl epoxide with a molecular weight of less than 200.

Tetrahydrofurans or Hexahydropyrans (Component A3)

These are compounds containing five or six membered saturated rings which are good solvents and are slower to ring open up than e.g. epoxy or oxetanes. Examples are 2-hydroxyethyl-tetrahydrofuran or hexahydropyran. Once ring opened, these compounds provide flexibility and toughness in the fully cured material.

Monofunctional (meth)acrylates Optionally Together with Difunctional (meth)acrylates (Component A4)

Representative examples of the photopolymerizable acrylic monomer are hydroxyalkyl acrylates such as 2-hydroxyethyl acrylate and 2-hydroxybutyl acrylate, mono- or diacrylates of glycols such as ethylene glycol, methoxytetraethylene glycol, polyethylene glycol and propylene glycol; acrylamides such as N,N-dimethylacrylamide, N-methylolacrylamide, etc.; aminoalkyl acrylates such as N,N-dimethylaminoethyl acrylate, etc.; phenoxy acrylate, bisphenol A diacrylate and acrylates of ethylene oxide or propylene oxide adducts of these phenols, etc.; acrylates of glycidyl ethers such as glycerin diglycidyl ether; and melamine acrylate, and/or methacrylates corresponding to the above acrylates, etc.

Diacrylates may be used in combination with mono-acrylic compounds as the low viscosity resins (A4). When present, the di(meth)acrylates preferably constitute less than 50% by weight of the mono- and di-(meth)acrylates.

Suitable examples of diacrylates and dimethacrylates (referred to as "di(meth)acrylates") are the di(meth)acrylates of cycloaliphatic or aromatic diols such as 1,4-dihydroxymethylcyclohexane, 2,2-bis(4-hydroxy-cyclohexyl)propane, bis (4-hydroxycyclohexyl)methane, hydroquinone, 4,4'-dihydroxybi-phenyl, bisphenol A, bisphenol F, bisphenol S, ethoxylated or propoxylated bisphenol A, ethoxylated or propoxylated bisphenol F or ethoxylated or propoxylated bisphenol S. Di(meth)acrylates of this kind are known and some are commercially available.

Preferred di(meth)acrylates are butane-diol-diacrylate, hexane-diol-diacrylate, neopentyl-diol-diacrylate).

The low viscosity resin is incorporated within polymer chains when the composition is cured so that, after cure is completed, no substantial amount of the resin remains. The low viscosity resin can be incorporated into the chain of the higher viscosity resin or it can polymerise with itself or with other resins.

The Higher Viscosity Resin (Component B)

The higher viscosity resin will generally determine the nature of the properties of the deposited composition and are chosen from the following:

B1) an epoxy resin and preferably a fast-reacting epoxy resin, for example a cycloaliphatic epoxy resin, e.g. 3,4-epoxycyclohexylmethyl-3,4-epoxycyclohexane carboxylate, or bis-(3,4-epoxycyclohexyl) adipate. Other epoxies (e.g. bisphenol-A epoxy, epoxy novolacs or epoxy functionalised polytetrahydrofurans and epoxidised polybutadienes) can also be used. The cycloaliphatic epoxy resin preferably forms at least 50% by weight of the epoxy resin component B1;

B2) compounds containing a reactive oxetane ring (e.g. 3,3'-[1,4-phenylene-bis(methyleneoxymethylene)]-bis(3-ethyloxetane), and higher oligomeric oxetanes), B3) multifunctional acrylates (e.g. multifunctional urethane acrylates, dipentaeythritol pentaacrylate diols, polycarbonate-di or multi acrylates)

Some higher viscosity resins will also act as tougheners, e.g. epoxidised butadiene, and when that is the case, it is not necessary to provide separate components as the higher viscosity resins and the tougheners since the same material can act in both capacities. These ingredients will now be described in greater detail:

Epoxy Resin (Component B1)

The epoxy resin (component B1) may expeditiously be a polyglycidyl compound or cycloaliphatic polyepoxide or epoxy cresol novolac or epoxy phenol novolac compound and which on average possesses more than one epoxide group (oxirane ring) in the molecule. Such resins may have an aliphatic, aromatic, cycloaliphatic, araliphatic or heterocyclic structure; they contain epoxide groups as side groups, or these groups form part of an alicyclic or heterocyclic ring system. Epoxy resins of these types are known in general terms and are commercially available.

Polyglycidyl esters and poly(β-methylglycidyl) esters are one example of suitable epoxy resins. Said polyglycidyl esters can be obtained by reacting a compound having at least two carboxyl groups in the molecule with epichlorohydrin or glycerol dichlorohydrin or β-methylepichlorohydrin. The reaction is expediently carried out in the presence of bases. The compounds having at least two carboxyl groups in the molecule can in this case be, for example, aliphatic polycarboxylic acids, such as glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, can be used.

Polyglycidyl ethers or poly(β-methylglycidyl)ethers can likewise be used. Said polyglycidyl ethers can be obtained by reacting a compound having at least two free alcoholic hydroxyl groups and/or phenolic hydroxyl groups with a suitably substituted epichlorohydrin under alkaline conditions or in the presence of an acidic catalyst followed by alkali treatment. Ethers of this type are derived, for example, from acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins. Suitable glycidyl ethers can also be obtained, however, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they possess aromatic rings, such as N,N-bis(2-hydroxyethyl)aniline or p,p'-bis(2-hydroxyethylamino)diphenylmethane.

Particularly important representatives of polyglycidyl ethers or poly(β-methylglycidyl)ethers are based on phenols; either on monocylic phenols, for example on resorcinol or hydroquinone, or on polycyclic phenols, for example on bis (4-hydroxyphenyl)methane (bisphenol F), 2,2-bis(4-hydroxyphenyl)propane (bisphenol A), or on condensation products, obtained under acidic conditions, of phenols or cresols with formaldehyde, such as phenol novolaks and cresol novolaks. These compounds are particularly preferred as epoxy resins for the present invention, especially diglycidyl ethers based on bisphenol A and bisphenol F and mixtures thereof.

Poly(N-glycidyl) compounds are likewise suitable for the purposes of the present invention and are obtainable, for example, by dehydrochlorination of the reaction products of epichlorohydrin with amines containing at least two amine hydrogen atoms. These amines may, for example, be n-butylamine, aniline, toluidine, m-xylylenediamine, bis(4-aminophenyl)methane or bis(4-methylaminophenyl)methane. However, other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin.

Poly(S-glycidyl) compounds are also suitable as the cationic curing resin herein, examples being di-S-glycidyl derivatives derived from dithiols, for example ethane-1,2-dithiol or bis(4-mercaptomethylphenyl)ether.

Examples of epoxide compounds in which the epoxide groups form part of an alicyclic or heterocyclic ring system include bis(2,3-epoxycyclopentyl)ether, 2,3-epoxycyclopentyl glycidyl ether, 1,2-bis(2,3-epoxycyclopentyloxy)ethane, bis(4-hydroxycyclohexyl)methane diglycidyl ether, 2,2-bis(4-hydroxycyclohexyl)propane diglycidyl ether, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl) hexanedioate, di(3,4-epoxy-6-methylcyclohexylmethyl) hexanedioate, ethylenebis(3,4-epoxycyclohexane-carboxylate, ethanediol di(3,4-epoxycyclohexylmethyl)ether, vinylcyclohexene dioxide, dicyclopentadiene diepoxide or 2-(3,4-epoxycyclohexyl-5,5-spiro-3,4-epoxy)cyclohexane-1,3-dioxane.

However, it is also possible to employ epoxy resins in which the 1,2-epoxide groups are attached to different heteroatoms or functional groups. Examples of these compounds include the N,N,O-triglycidyl derivative of 4-aminophenol, the glycidyl ether/glycidyl ester of salicylic acid, N-glycidyl-M-(2-glycidyloxypropyl)-5,5-dimethylhydantoin or 2-glycidyloxy-1,3-bis(5,5-dimethyl-1-glycidylhydantoin-3-yl)propane.

Preferred examples of epoxy resins are 3,4-epoxycyclohexylmethyl-3,4-epoxycyclohexane carboxylate, or bis-(3,4-epoxycyclohexyl) adipate, epoxidised polybutadienes. Other epoxies can be used, e.g. bisphenol-A epoxy, epoxy novolacs or epoxy functionalised polytetrahydrofurans.

Compounds Containing a Reactive Oxetane Ring (Component B2)

These compounds are essentially as defined above with respect to component A1) and Formulae (I) to (III) except that they are of higher molecular weight than Component A1). Suitable examples are 3,3'-[1,4-phenylene-bis(methyleneoxymethylene)]-bis(3-ethyloxetane), and higher oligomeric oxetanes and trimethylene oxides.

Multifunctional (Meth)acrylates (Component B3)

The optional free radically curable component preferably comprises at least one solid or liquid poly(meth)acrylates, for example, be di-, tri-, tetra- or pentafunctional monomeric or oligomeric aliphatic, cycloaliphatic or aromatic acrylates or methacrylates. The compounds preferably have a molecular weight of from 200 to 500.

Examples of suitable aliphatic poly(meth)acrylates are the triacrylates and trimethacrylates of hexane-2,4,6-triol, glycerol or 1,1,1-trimethylolpropane, ethoxylated or propoxylated glycerol or 1,1,1-trimethylolpropane, and the hydroxyl-containing tri(meth)acrylates which are obtained by reacting triepoxide compounds, for example the triglycidyl ethers of said triols, with (meth)acrylic acid. It is also possible to use, for example, pentaerythritol tetraacrylate, bistrimethylolpropane tetraacrylate, pentaerythritol monohydroxytriacrylate or -methacrylate, or dipentaerythritol monohydroxypentaacrylate or -methacrylate.

Other di(meth)acrylates which can be employed are compounds of the formulae (F-I), (F-II), (F-III) or (F-IV)

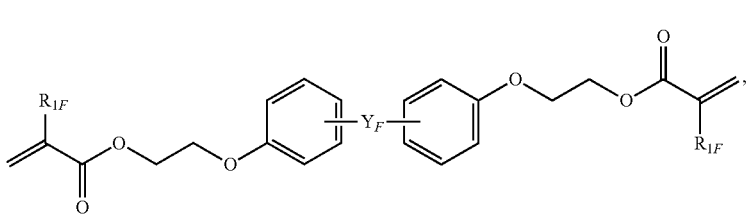

(F-I)

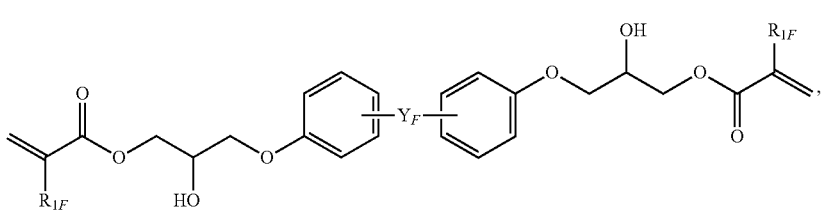

(F-II)

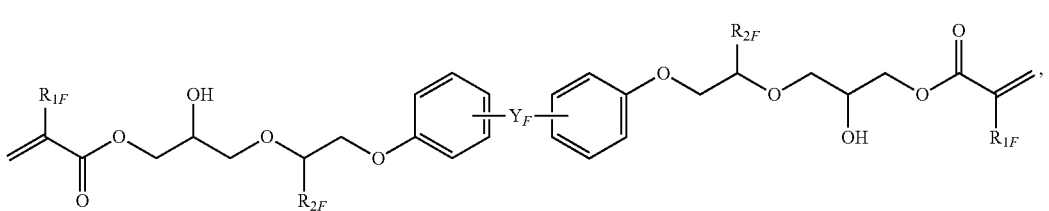

(F-III)

-continued

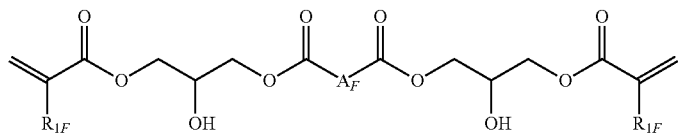
(F-IV)

in which
$R_{1F}$ is a hydrogen atom or methyl,
$Y_F$ is a direct bond, $C_1$-$C_6$alkylene, —S—, —O—, —SO—, —SO$_2$— or —CO—,
$R_{2F}$ is a $C_1$-$C_8$alkyl group, a phenyl group which is unsubstituted or substituted by one or more $C_1$-$C_4$alkyl groups, hydroxyl groups or halogen atoms, or is a radical of the formula —CH$_2$—OR$_{3F}$ in which
$R_{3F}$ is a $C_1$-$C_8$alkyl group or phenyl group, and
$A_F$ is a radical selected from the radicals of the formulae

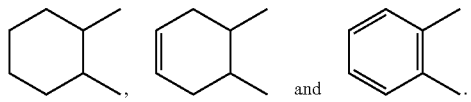

Further examples of possible di(meth)acrylates are compounds of the formulae (F-V), (F-VI), (F-VII) and (F-VIII)

and phenol or cresol novolaks containing three hydroxyl groups, with (meth)acrylic acid.

The (meth)acrylates used herein are known compounds and some are commercially available, for example from the SARTOMER Company under product designations such as SR® 295, SR® 350, SR®351, SR®367, SR® 399, SR®444, SR®454 or SR® 9041. Other examples of commercially available products of these polyfunctional monomers are KAYARAD R-526, HDDA, NPGDA, TPGDA, MANDA, R-551, R-712, R-604, R-684, PET-30, GPO-303, TMPTA, THE-330, DPHA-2H, DPHA-2C, DPHA-21, D-310, D-330, DPCA-20, DPCA-30, DPCA-60, DPCA-120, DN-0075, DN-2475, T-1420, T-2020, T-2040, TPA-320, TPA-330, RP-1040, R-011, R-300, R-205 (Nippon Kayaku Co., Ltd.), Aronix M-210, M-220, M-233, M-240, M-215, M-305, M-309, M-310, M-315, M-325, M-400, M-6200, M-6400 (Toagosei Chemical Industry Co, Ltd.), Light acrylate BP-4EA, BP-4PA, BP-2EA, BP-2PA, DCP-A (Kyoeisha Chemical Industry Co., Ltd.), New Frontier SPE-4, TEICA,

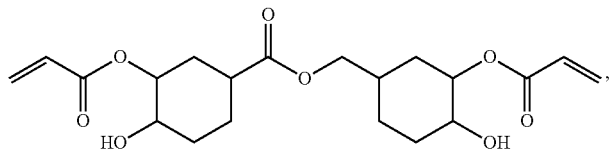
(F-V)

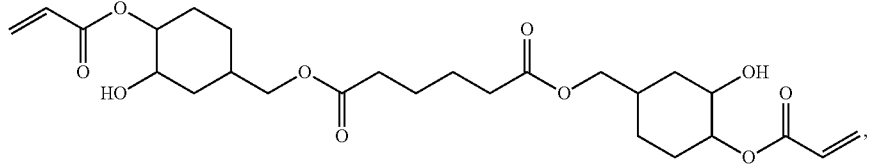
(F-VI)

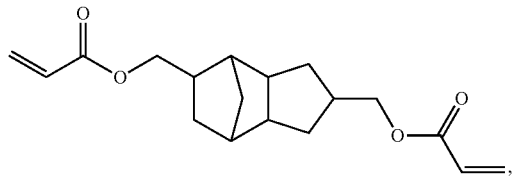
(F-VII) (F-VIII)

These compounds of the formulae (F-I) to (F-VIII) are known and some are commercially available. Their preparation is also described in EP-A-0 646 580.

It is additionally possible, for example, to use polyfunctional urethane acrylates or urethane methacrylates. These urethane (meth)acrylates are known to the person skilled in the art and can be prepared in a known manner by, for example, reacting a hydroxyl-terminated polyurethane with acrylic acid or methacrylic acid, or by reacting an isocyanate-terminated prepolymer with hydroxyalkyl (meth)acrylates to give the urethane (meth)acrylate. These materials also act as tougheners.

Examples of suitable aromatic tri(meth)acrylates are the reaction products of triglycidyl ethers of trihydric phenols BR-42M, GX-8345 (Daichi Kogyo Seiyaku Co., Ltd.), ASF-400 (Nippon Steel Chemical Co.), Ripoxy SP-1506, SP-1507, SP-1509, VR-77, SP-4010, SP-4060 (Showa Highpolymer Co., Ltd.), NK Ester A-BPE-4 (Shin-Nakamura Chemical Industry Co., Ltd.), SA-1002 (Mitsubishi Chemical Co., Ltd.), Viscoat-195, Voscoat-230, Viscoat-260, Viscoat-310, Viscoat-214HP, Viscoat-295, Viscoat-300, Viscoat-360, Viscoat-GPT, Viscoat-400, Viscoat-700, Viscoat-540, Viscoat-3000, Viscoat-3700 (Osaka Organic Chemical Industry Co., Ltd.).

Tougheners (Component C)

The compositions according to the invention also contains tougheners which are functionalised polymers or oligomers, preferably having a functionality of at least 2, such as functionalised polyesters (e.g. polycaprolactones), polyethers (e.g. polytetrahydrofuran), polyurethanes, polybutadienes. The functionality is provided by groups that will react with components A and/or B of the composition, such as hydroxy, epoxy or acrylic groups. Where the toughener has a functionality of 2 or more, the reactive group may be the same or different.

As mentioned above, some of the tougheners will also act as the higher viscosity resin (component B) and if that is the case, then a separate toughener need not be provided.

The toughener may be a hydroxy terminated polyether, such as a polytetrahydrofuran diol and polyol having a molecular weight of about 250 to about 4000 such as described in U.S. Pat. Nos. 5,476,748, 6,413,697, U.S. Pat. No. 6,379,866, U.S. Pat. No. 5,629,133 and U.S. Pat. No. 5,972,563, or a siloxane/polyethylene oxide copolymer (see e.g. U.S. Pat. No. 5,629,133).

Mixtures of polyols are preferred to achieve non brittle, flexible fully cured materials from cationically polymerised compositions. Examples of such polyol mixtures are as described in U.S. Pat. No. 5,340,900, comprising polyols having 3 to 8 hydroxy groups, mixed with polyether polyols having 2 to 3 hydroxy groups.

Particularly useful polyols are those based on (i.e. functionalised forms of) polycaprolactones, such as CAPA 2054, 3031, 301, 3050, 3091.

Epoxy or acrylic functionalised oligomers or low molecular weight polymers are also advantageously useful as reactive modifiers. For example, epoxidised butadienes, triglycidylether of poly(isopropoxylated) glycerol (see U.S. Pat. No. 6,413,697) and acrylated polycarbonates.

Examples of urethane tougheners include hydroxy, or (meth)acrylic functionalised urethanes. These urethane (meth)acrylates are known to the person skilled in the art and can be prepared in a known manner by, for example, reacting a hydroxyl-terminated polyurethane with acrylic acid or methacrylic acid, or by reacting an isocyanate-terminated prepolymer with hydroxyalkyl (meth)acrylates to give the urethane (meth)acrylate.

These functionalised tougheners are used with the appropriate resin mixture comprising the low and high viscosity resin. For example:

For cationic systems, polyol or cycloaliphatic functionalised toughener (such as polycaprolactone or poly(tetrahydrofuran)) is added to a mixture of oxetane and cycloaliphatic resins.

For hybrid systems involving both cationic and radical cure mechanisms, suitable polyol tougheners can be added, such as hydroxy, epoxy or acrylate functionalised polycaprolactones, polytetrahydrofurans and polycarbonates.

Initiators (Component D)

Suitable cationic photo initiators should be included in the composition to initiate the polymerisation of the resins upon exposure to radiation. Such photo initiators are well known in the art and are generally onium salts that release Lewis acids on exposure to light. Especially preferred are initiators that release tetrafluoroborate, hexafluorophosphate, hexafluoroantimonate, hexafluoroarsenate and hexachloroantimonate when exposed to radiation.

Preferred examples of commercially available products of the cationic photo-initiator are UVI-6950, UVI-6970 (bis[4-(di(2-hydroxyethyl)phenyl)sulfonio]-phenylsulfide), UVI-6974 (bis[4-diphenylsulfonio-phenyl]sulfidebishexafluoro-antimonate, UVI-6990 (hexafluorophosphate salt of UVI-6974) (manufactured by Union Carbide Corp), Adekaoptomer SP-151, SP-170 (bis[4-(di(4-(2-hydroxyethyl) phenyl)sulfonio]-phenylsulfide), SP-171 (manufactured by Asahi Denka Kogyo Co., Ltd.), Irgacure 261 (.eta.sup.5-2,4-(cyclopentadien-1-yl)-[(1,2,3,4,5,6-.eta.)-(1-methylethyl) benzene]-ir on (1+)-hexafluorophosphate(1−)) (manufactured by Ciba Geigy), CI-2481, CI-2624, CI-2639, CI-2064 (manufactured by Nippon Soda Co., Ltd.), CD-1010, CD-1011, CD-1012 (4-(2-hydroxytetra-decanyloxy)-diphenyliodonium hexafluoroantimonate (manufactured by Sartomer Co., Ltd.), DTS-102, DTS-103, NAT-103, NDS-103 ((4-hydroxynaphthyl)-dimethylsulfonium hexafluoroantimonate), TPS-102 (triphenylsulfonium hexafluoroantimonate), TPS-103 (triphenylsulfonium hexafluoroantimonate), MDS-103 (4-methoxyphenyl-diphenylsulfonium hexafluoroantimonate), MPI-103 (4-methoxyphenyliodonium hexafluoroantimonate), BBI-101 (bis(4-tert-butylphenyl)iodonium tetrafluoroborate), BBI-102 (bis(4-tert-butylphenyl) iodonium hexafluoro-phosphate), BBI-103 (bis(4-tert-phenyl)iodonium hexafluoroantimonate), (manufactured by Midori Chemical Co., Ltd.), and Degacure K126 (bis[4-(diphenylsulfonio)-phenyl]sulfide bishexafluorophosphate) (manufactured by Degussa Ltd.). Among these, UVI-6970, UVI-6974, Adekaoptomer SP-170, SP-171, CD-1012, MPI-103 are particularly preferred. However, this invention is not limited to these examples.

If appropriate, the initiator system is a combination of radical and cationic initiators. Conventional radical photoinitiators may be used, e.g. acetophenone, acetophenone benzyl ketal, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, 3,3'-dimethyl-4-methoxybenzophenone, thioxanethone compounds, 2-methyl-1-4-(methylthio) phenyl-2-morpholino-propane-2-on, 2-benzyl-2-dimethylamino-1-(4-morpholinophenyl)-butan-1-one, triphenylamine, 2,4,6-trimethylbenzoyl diphenylphosphine oxides, bis(2,6-dimethoxybenzoyl)-2,4,4-tri-methylpentyl-phosphine oxide, benzyl dimethyl ketal, 1-hydroxycyclohexyl phenyl ketone, 2-hydroxy-2-methyl-1-phenylpropane-1-one, fluorenone, fluorene, benzaldehyde, benzoin ethyl ether, benzoin propyl ether, benzophenone, Michler's ketone, 3-methylacetophenone, 3,3',4,4'-tetra (t-butyl peroxycarbonyl)benzophenone (BTTB), and combined compositions of BTTB and xanthene, thioxanthene, cumarin, ketocumarin or other coloring matter photo sensitizer. Among these, benzyl dimethyl ketal, 1-hydroxycyclohexyl phenyl ketone, 2,4,6-trimethylbenzoyl diphenylphosphine oxide, 2-benzyl-2-dimethylamino-1-(4-morpholinophenyl)-butan-1-one.

Inhibitors/Stabilisers (Component E)

The inhibitors/stabilisers prevent curing of the resin composition as it is held at room temperature or at elevated temperature in a reservoir of a jetting apparatus. The amount of inhibitors/stabilisers should be sufficient to achieve that purpose but not so much as to significantly delay or inhibit photocuring after jetting. Generally the amount of inhibitors/stabilisers should be 0.02 to 0.5% of the weight of the composition.

Suitable inhibitors/stabilisers for the cationic photo initiators should be included in the composition to prevent the premature initiation of curing especially in the reservoir holding the composition prior to jetting, which causes a rise in viscosity in the reservoir. Such inhibitors for cationic polymerisation are well-known in the art, e.g. benzyl-N,N'-dimethylamine (BDMA) and other stabilisers as described in U.S. Pat. No. 6,350,403.

Stabilisers for radical curable resins are well known and can be included, e.g. hydroquinones, for acrylates, when part of the jettable composition is radically cured.

Importantly, stabilisers for the whole composition should be present which prevent the long-term corrosion of the piezo print head.

Additional Ingredients

If necessary, the resin composition according to the present invention may contain other materials in suitable amounts, as far as the effect of the present invention is not adversely affected. Examples of such materials include radical-polymerizable organic substances other than the aforementioned cationically polymerizable organic substances; heat-sensitive polymerisation initiators; various additives for resins such as colouring agents such as pigments and dyes, antifoaming agents, levelling agents, thickening agents, flame retardant and antioxidant; fillers such as silica, alumina, glass powder, ceramic powder, metal powder and modifier resins. Particular examples of the radical-polymerizable organic substances include but not limited to compounds that thermally polymerise, while those of the heat-sensitive polymerisation initiator includes aliphatic onium salts disclosed in Japanese Patent Laid-Open Nos. 49613/1982 and 37004/1983.

The filler to be used for the resin composition according to the present invention must satisfy requirements that it hinders neither cationic nor radical polymerizations and the filled composition has a relatively low viscosity suitable for the jetting process. These fillers may be used alone or as a mixture of two or more of them depending upon the desired performance. The fillers used in the present invention may be neutral acidic or basic.

The filler material can optionally be surfaced treated with various compounds-coupling agents. Examples include methacryloxy propyl trimethoxy silane, beta-(3,4-epoxycyclohexyl)ethyl trimethoxy silane, gamma-glycidoxy propyl trimethoxy silane and methyl triethoxy silane. The most preferred coupling agents are commercially available from Osi Chemicals Corp. and other chemical suppliers.

The composition can also contain small amounts of low molecular weight curable compounds (mw<200 and generally <100) to act as co-diluents with the low viscosity resins, reducing the viscosity of the composition; suitable compounds are vinyl ethers (e.g. 1,4-cyclohexane dimethanol divinylether, triethyleneglycol divinylether or hexane-1,6-diol divinyl ether). Because the acrylate and vinyl ether diluents react faster than the higher viscosity resin, they are preferably not used as the low viscosity resin. However, they can perform a useful function in providing in flight curing, whereby the droplets be are partially cured in flight so that, on impact on the target, they do not spread out excessively. Excessive spreading leads to loss of definition and poor tolerances. Naturally, in any in flight curing, the nozzle(s) of the jet should be shielded from the curing light to prevent any curing within the nozzle, which could cause blockage.

According to a second aspect of the present invention, there is provided a jettable composition comprising (in percentage by weight):

25-80% the at least one low viscosity reactive resin (Component A);

2-60% the at least one higher viscosity resin (Component B);

2-25% toughener (Component C);

0-10% curable co-diluents, e.g. vinyl ether resin, 0.1-10% initiators (Component D);

0.02-0.5% stabilisers (Component E);

0-25% additives such as dyes, pigments, fillers and other standard additives,

The preferred amount of:

the at least one low viscosity reactive resin (Component A) is 25-60%, e.g. 30-40%;

the at least one higher viscosity resin (Component B) is 25-55%, e.g. 40-50%;

the toughener (Component C); is 5-25%, e.g. 10-20%.

Preferably, the molecular weight of the higher viscosity resin is at least 1.5 times (and more preferable at least twice) that of the low viscosity resin.

The preferred system is an oxetane as the low viscosity resin and a bi-functional cycloaliphatic epoxy resin as the higher viscosity resin. In this case, a hydroxy or epoxy functionalised toughener is useful, especially hydroxy functionalised polycaprolactone.

Alternatively, a mono-functional acrylate (optionally in conjunction with a bi-functional acrylate) could be used as the low viscosity resin and a higher functional acrylate is used as the higher viscosity resin. Urethane acrylates and polycarbonate acrylates are useful tougheners for this free radically curable class of composition.

According to a further aspect of the present invention, there is provided a process of jet depositing a composition as set out above, which process comprises depositing successive droplets of the composition described above and irradiating the droplets to cure the composition, the droplets being deposited in accordance with a desired shape e.g. as stored in a computer file, such as a CAD file.

The system lends itself well to varying the microproperties of the cured deposit by jetting two or more different compositions since it is possible to maintain the low viscosity resin as common to all the compositions and to vary the composition of the higher viscosity resin between compositions. Because the low viscosity resin is common, droplets of different compositions lying adjacent to each other (either side-by-side or one above the other in different deposited layers) will "stitch" together as described above.

The composition can be deposited on any substrate, e.g. paper, textiles, metal powder, paste or on prior layers of itself, which is a useful way of building a three dimensional object.

Alternatively, it is possible to deposit the composition at the present invention on bed made of a curable powder. The details of a process of jet depositing a curable composition onto a powder bed is described in PCT Specification WO02/064354. Essentially, the process involves spreading a thin layer of powder onto a substrate and jet depositing the composition on desired areas of the powder bed. The areas where the jetted composition wets the powder cures up while the other areas of the powder bed remains uncured. A further layer of powder can be placed on top of the first layer and the process repeated to build up a three-dimensional object. The individual layers can be cured after jet deposition. Any uncured powder is removed after the object has been built.

The deposits are preferably irradiated immediately on deposition. A final heat and/or radiation cure may be provided of the whole object after removal of the non-cured powder. Typical cure conditions would be 30 minutes at 80° C. and/or exposure to radiation in a flood curing system such as in a Post Curing Apparatus commonly used in stereolithography.

EXAMPLES

Figure 1:
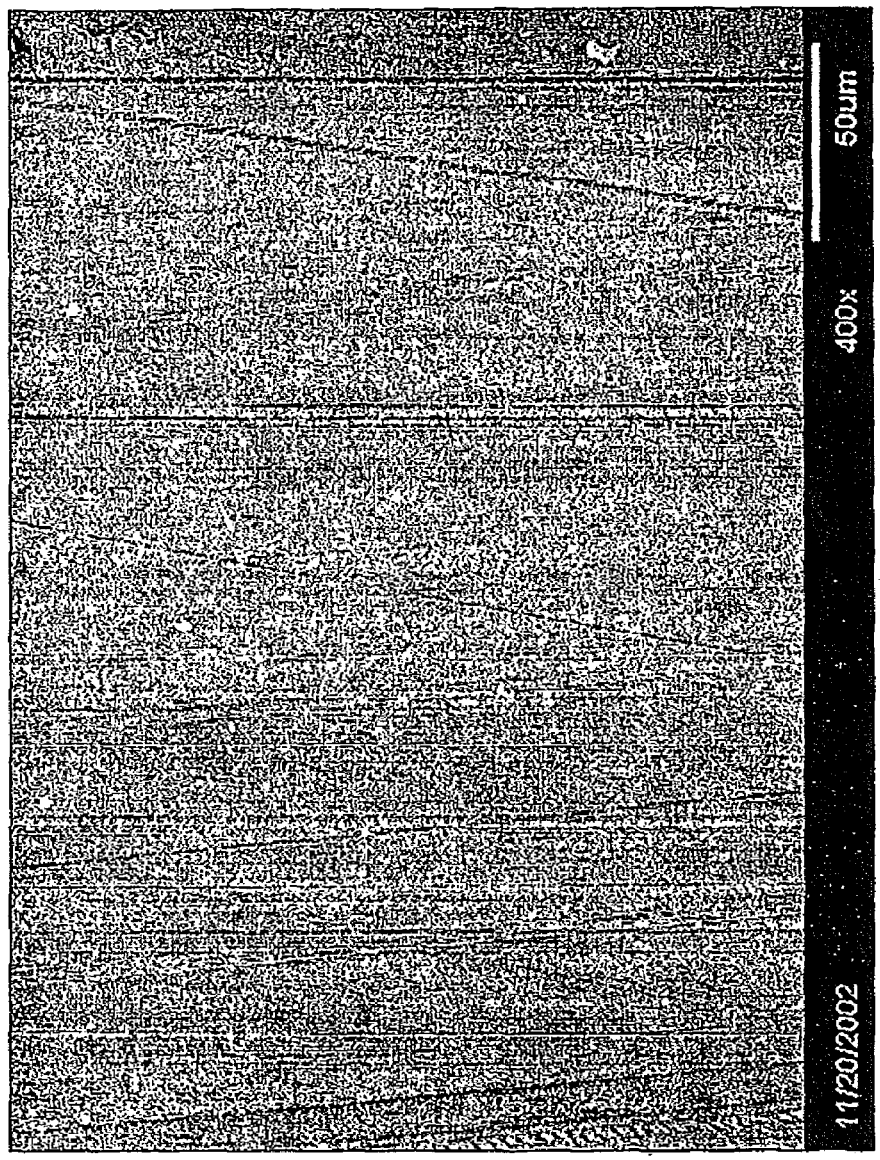
FIG. 1 is a scanning electron microscope picture of a two-layer deposit as detailed in Example 14.

There will now be described, by way of example only, various compositions of the present invention.

Details of the raw materials used in the Examples are set out in Table 1.

TABLE 1

Raw materials

| Material | Supplier | Description |
|---|---|---|
| Component A Low Viscosity Resin | | |
| Cyracure UVR 6000 | Union Carbide | 3-Ethyl-3-(hydroxymethyl) oxetane |
| Isobornyl acrylate | Cray Valley | |
| Genomer 1234 | Rahn | Tripropylene glycol diacrylate* |
| SR306 | Cray Valley | Tripropylene glycol diacrylate* |
| SR238 | Cray Valley | 1,6-Hexanediol diacrylate* |
| CD 581 | Sartomer | Alkoxylated cyclohexane dimethanol diacrylate* |
| Component B Reactive Higher Viscosity Resin | | |
| Uvacure 1500 | UCB | 3,4-Epoxy cyclohexyl methy-3,4-epoxy cyclohexyl carboxylate |
| SR399 | Cray Valley | Pentafunctional hydroxyacrylate |
| Actilane 251 | Akros | Trifunctional urethane acrylate |
| Genomer 1234 | Rahn | Tripropylene glycol diacrylate |
| UVR6105 | Union Carbide | 3,4-Epoxy cyclohexyl methyl-3,4-epoxy cyclohexyl carboxylate |
| SR454 | Cray Valley | Ethoxylated trimethylolpropane triacrylate |
| SR306 | Cray Valley | Tripropylene glycol diacrylate* |
| SR238 | Cray Valley | 1,6-Hexanediol diacrylate* |
| CD 581 | Sartomer | Alkoxylated cyclohexane dimethanol diacrylate* |
| Genomer 1343 | Rahn | Trimethylpropane ethoxylate triacrylate |
| Co-diluent | | |
| DVE-3 | BASF | Triethylene glycol divinyl ether |
| Component C Toughener/Polyol | | |
| CAPA2054 | Solvay | Polycaprolactone triol |
| CAPA3031 | Solvay | Polycaprolactone triol |
| CAPA301 | Solvay | Polycaprolactone triol |
| CAPA3050 | Solvay | Polycaprolactone triol |
| CAPA3091 | Solvay | Polycaprolactone triol |
| PTHF250 | Aldrich | Polytetrahydrofuran |
| PTHF1000 | Aldrich | Polytetrahydrofuran |
| Simulsol TOMB | SEPPIC | Polyether triol |
| PPG-PEG-PPG | Aldrich | Copolymer of polypropyl glycol/polyethylene glycol |
| Component D Photoinitiator | | |
| UVI6976 (Cationic) | Union Carbide | Cationic photoinitiator, as 50% solution in propylene carbonate |
| Speedeure IVX | Lambson Fine Chemical Ltd., U.K | |
| Quantacure ITX | Great Lakes | Isopropylthioxanthone |
| IRG 907 | Sartomer | Benzophenone |
| Irgacure 184 | | 1-hydroxycyclohexyl phenyl ketone |
| OTHER | | |
| Mowital B60T Powder | Clariant | Polyvinylbutyral |
| BDMA stabilizer | Aldrich | Benzyl N,N-dimethylamine |
| DY9577 stabilizer | Vantico AG | boron trichloride/dimethyl-octylamine complex |

*di acrylates may be included as component A or component B depending on the nature of the other components of the composition.

Examples 1-4 and Comparative Examples 1-3

Jetting Characteristics

Various formulations were made up as set out in Table 2. These are in accordance with the present invention when a toughener and a stabiliser are added. However, these examples were intended to show that compositions can be made using the theory underlying the present invention that are jettable. Similar results are expected for compositions with a stabiliser.

TABLE 2

Formulations

| | A | B | C | D | E | F | G | H | I | J |
|---|---|---|---|---|---|---|---|---|---|---|
| Base Resin A | | | | | | | | | | |
| UVR6000 | | 95 | 45 | 40 | 35 | 25 | | 35 | 30 | 30 |
| Isobornyl acrylate | | | | | | | 40 | | | |
| Genomer 1234 | | | | | | | 25 | | | |
| Reactive Component B | | | | | | | | | | |
| Uvacure 1500 | 95 | | 50 | 50 | 40 | 40 | | 50 | 35 | 40 |
| Genomer 1343 | | | | | | | 10 | | | |
| SR399 | | | | | 20 | | | | | |
| Actilane 251 | | | | | | 15 | | | | |
| SR454 | | | | | 20 | | | | 10 | 8 |
| CD581 | | | | | | | | | 15 | 12 |
| Co-diluents | | | | | | | | | | |
| DVE3 | | | 5 | | 10 | | | 10 | 14 | 5 |
| Initiators | | | | | | | | | | |
| Speedcure ITX | | | | | | | 2 | | | |
| Quantacure | | | | | | | 3 | | | |
| EHA | | | | | | | | | | |
| Irg907 | | | | | | | 5 | | | |
| UVI6976 | 5 | 5 | 5 | 5 | 3 | 3 | | 5 | 4 | 3 |
| Irl84 | | | | | 2 | 2 | | | 2 | 2 |

Viscosity of fluids was measured using a Brookfield HBTD Viscometer (0.8° cone spindle) at both 25° C. and 70° C.

Fluids were jetted using a 50 μm single nozzle jet device mounted in a Jetlab (Microfab Inc, Plano, Tex.) at 70° C. Peak voltage and rise, dwell and fall times were adjusted until stable jetting was obtained. Droplet size was measured by weighing the amount of fluid dispensed in a known time, thus calculating mass of each droplet. The size of a single droplet deposited on a glass slide was measured using a calibrated graticule in a microscope.

TABLE 3

Jetting characteristics of fluids

| Example | Fluid | Viscosity 25° C. | Viscosity 70° C. | Ink Jet Parameters Rise & Fall/ μs | Dwell/ μs | Dwell/ V | Temp/ °C. | Freq/ Hz | Droplet Mass/ ng | Droplet Size (on impact)/ μm |
|---|---|---|---|---|---|---|---|---|---|---|
| 1 | C | 45 | 9 | 5 | 50 | 50 | 70 | 3000 | 139 | 130 |
| 2 | D | 33 | 6 | 5 | 50 | 45 | 70 | 3000 | 157 | 140 |
| 3 | E | 42 | 7 | 5 | 50 | 55 | 70 | 3000 | 142 | 140 |
| 4 | F | 62 | 8 | 5 | 50 | 55 | 70 | 3000 | 196 | 130 |
| Comp 1 | A | 193 | 12 | 5 | 50 | 75 | 90 | 3000 | 184 | 120 |
| Comp 2 | B | 25 | 5 | 5 | 50 | 40 | 70 | 3000 | 69 | 200 |
| Comp 3 | G | 15 | 3 | 5 | 50 | 35 | 70 | 3000 | 186 | 150 |

All fluids jet reliably to produce single droplets with no satellites, except for Comparative example 1 that due to higher viscosity required at temperature of 90° C. for reliable jetting. Comparative example 2 (fluid B, low viscosity resin alone) jets reliably but droplets do no cure well on substrate. Comparative example 3 (fluid G) is based on a composition disclosed in WO99/29788 (Xaar Technology Ltd). Fluids C—F perform in a similar manner to this fluid at 70° C., but gives smaller spot sizes than comparative example 2 despite comparative drop sizes (droplet size is the diameter of the droplet in flight and spot size is the diameter of the droplet relic on the substrate).

Examples 5-8 and Comparative 4-6

Cured Fluid Properties

Fluids were poured into a silicone mould and cured under UV (Fusion Systems F450 lamp, 120 W/cm$^2$, 7.5 s). The parts were removed from the mould, turned, and cured under UV again (Fusion SystemsF450 lamp, 120 W/cm$^2$, 7.5 s). Tensile properties were measured using Stable Micro Systems TA-HDi Texture Analyser, test speed 0.08 mm/s, grip distance 55 mm and the results are set out in Table 4.

TABLE 4

Mechanical properties of cured fluids

| Example | Fluid | Tensile Strength/ MPa | Tensile Modulus MPa |
|---|---|---|---|
| 5 | C | 55.5 | 2347 |
| 6 | D | 70.7 | 2247 |
| 7 | E | 67 | 2079 |
| 8 | F | 51 | 2251 |
| Comp 4 | A | NA | NA |
| Comp 5 | B | NA | NA |
| Comp 6 | G | 10.3 | 684 |

The tensile strength of comparative example 4 could not be measured as it did not cure through. Comparative example 5 exhibited very slow cure with smoking and bubbling of resin occurring. Even after a prolonged time in the mould, samples were too weak to remove without breakage, demonstrating that low viscosity resin alone does not produce good mechanical properties. Comparative example 6 produced very weak specimens. Examples 5-8 produced robust specimens with tensile strengths comparable to those of engineering thermoplastics. Thus fluids C—F have far superior bulk properties to conventional acrylate inks or either the low viscosity resin alone (fluid B) or the high viscosity fluid alone (fluid A).

Examples 9-12

3D Printing Application Using Powders as Receiving Substrates

Mechanical test specimens were built using the following procedure.

1. A layer of the appropriate powder (500 μm) was spread on a metal substrate.
2. The appropriate resin was jetted onto the powder using a Microfab single jet head heated to 70° C., in a pattern consisting of lines spaced laterally by 250 μm, at a density given below. The pattern was then cured by exposure to UV light (4 W, UVA, 120 mJ/cm$^2$)
3. A further layer of powder (300 μm) was spread over the previous layer, and step 2 repeated.
4. Step 4 was repeated 3 times. The article was removed from the free powder, and tensile properties were measured using Stable Micro Systems TA-HDi Texture Analyser, test speed 0.08 mm/s, grip distance 55 mm.

Four tests were carried out (Examples 9 to 12) and the parameters of the Test and the properties of the resulting samples are shown in Table 5.

TABLE 5

| Example | Powders | Fluids | Tensile Stress MPa | Elongation at Break % | Modulus MPa | Droplets per mm |
|---|---|---|---|---|---|---|
| 9 | B60T | C | 38.8 | 7.7 | 861 | 300 |
| 10 | B60T | H | 24.4 | 3.3 | 950 | 300 |
| 11 | B60T | I | 11.9 | 34.1 | 230 | 300 |
| 12 | B60T | J | 65.1 | 5.3 | 2061 | 350 |

Thus such formulations are also suitable for 3D printing involving powder substrates, giving good material properties.

Further formulations were produced as set out in Table 6. Tensile test bars were prepared for the compositions by the following procedure. Fluids were poured into a silicone mould (2 mm thick) and cured under UV (Fusion Systems F450 lamp, 120 W/cm$^2$) at a speed of 10 m/min for 3 times. The parts were removed from the mould, turned, and cured under UV at a speed of 10 m/min for 3 times. Tensile properties were measured using Stable Micro Systems TA-Hdi Texture Analyser, test speed 0.08 mm/s, grip distance 55 mm. The viscosities of these fluids was in the range 60 to 70 cps at 25° C. The Tensile test results are given in Table 6.

TABLE 6

| | K | L | M | N | O | P | R | S | T | U | V | W |
|---|---|---|---|---|---|---|---|---|---|---|---|---|
| UVR6105 | 50 | 50 | 50 | 50 | 50 | 40 | 50 | 45 | 50 | 45 | 45 | 40 |
| UVR6000 | 35 | 35 | 35 | 35 | 35 | 35 | 35 | 35 | 35 | 40 | 35 | 35 |
| UVI6976 | 5 | 5 | 5 | 5 | 5 | 5 | 5 | 5 | 5 | 5 | 5 | 5 |
| PTHF250 | 10 | | | | | | | | | | | |
| PTHF1000 | | 10 | | | | | | | | | | |
| PPG-PEG-PPG | | | 10 | | | | | | | | | |
| CAP2054 | | | | 10 | | | | | | | | |
| CAP3031 | | | | | 10 | 20 | | | | | | |
| CAP3050 | | | | | | | 10 | 15 | | | | |
| CAP3091 | | | | | | | | | 10 | | | |
| Simulsol TOMB | | | | | | | | | | 10 | 15 | 20 |
| Tensile Stress/MPa | 56 | 60 | 58 | 59 | 75 | 35 | 71 | 65 | 69 | 56 | 57 | 28 |
| Elongation at Break/% | 4.9 | 4.3 | 4 | 4.9 | 4.5 | 20 | 4.5 | 6.2 | 4.4 | 6 | 6 | 14 |
| Tensile Modulus/MPa | 1827 | 1835 | 1976 | 1915 | 2490 | 141 | 2389 | 2147 | 2338 | 1578 | 1670 | 884 |

The compositions may include a stabilizer, as discussed in Example 15.

The jetting characteristics of the compositions that showed the best results from Table 6 were tested and the results are set out in Table 7.

TABLE 7

| | Ink Jet Parameters | | | | | | | Droplet |
|---|---|---|---|---|---|---|---|---|
| | Viscosity/cps | | Rise & Fall/ | Dwell/ | Dwell/ | Temp/ | Freq/ | Droplet Mass/ | Size(on impact)/ |
| Fluid | 25° C. | 70° C. | µs | µs | V | ° C. | Hz | ng | µs |
| O | 69 | 8 | 5 | 30 | 45 | 70 | 4000 | 138 | 130 |
| V | 62 | 5 | 5 | 50 | 75 | 75 | 4000 | 180 | 150 |

Both compositions are readily jettable and yield a good balance of flexibility and strength in the formed cured article; in addition, formulations V is also more water resistant than O.

Example 13

Jettable Composition

The following components were mixed by tumbling in a glass bottle for 2 hours, under yellow light conditions

| | |
|---|---|
| UVR6105 | 50 g |
| UVR6000 | 35 g |
| CAP301 | 10 g |
| UVI 6976 | 5 g |
| Stabilizer BDMA | 0.1 g |

The liquid resin had following properties:

Viscosity (Brookfield viscometer/rate 100 rpm): 70 mPas/25° C.; 8 mPas/70° C.

Surface tension: 42 dynes/cm

The above UV curable composition was deposited on a test substrate with a specific pattern using a single piezoelectric jet printer head from Microfab Technologies Inc, Plano, Tex., USA. The printhead was heated to 70° C. under the following parameters:

Printhead Scan rate was 20 mm/second

The drop density was 150 droplets/mm with a line space of 0.25 mm

Example 14

Using the jettable toughened, stabilised composition of Example 13, two overlapping lines of droplets were deposited as set out in Example 13 onto a polypropylene carrier sheet at a drop density of 150 droplets/mm with a line space of 0.25 mm and UV cured under a 4 W UVA lamp with a curing energy of 120 mJ/cm². Where a two layer deposit is formed, the second layer is deposited on the first layer and cured under identical conditions.

A one-layer specimen and a two-layer specimen were examined using the SIEM method (Speckle Interferometry with Electron Microscopy). SIEM is a micro/nano-scale technique that is able to perform full field displacement mapping over a region of only a few microns in diameter. First, a random speckle pattern of nanoscale gold particles, which serve as displacement gauges, is deposited on a specimen surface. The specimen is placed under a load and the nanospeckle patterns before and after deformation of the specimen as a result of the load are recorded using a scanning electron microscope. Displacement fields corresponding to the relative motions of the speckle particles under a given load (expressed in grams) can be obtained through the calculation of CAST (Computer Aided Speckle Interferometry). Strain fields are then obtained by differentiating the displacement fields. For uniaxial tension testing, the resulting stress-strain curve gives the Young's modulus by linear regression.

A specimen of about 20 mm length was cut from each of the two deposits and speckles were vacuum-deposited on the bottom (flat surface) of the two specimens. Each specimen was then bonded at its ends to a loading stage and elongated with specific loads (ranging from 0 to 73 gram and 0 to 34 gram for the two-layer and one-layer specimens respectively) for uniaxial tension testing. Each load corresponds to a measurement point of the stress-strain curve. The stress was calculated from the load and the area of the cross-section, while the strain was obtained by differentiating the displacement field in the direction of the load. The loading direction in both experiments is in the vertical direction.

Figure 2:
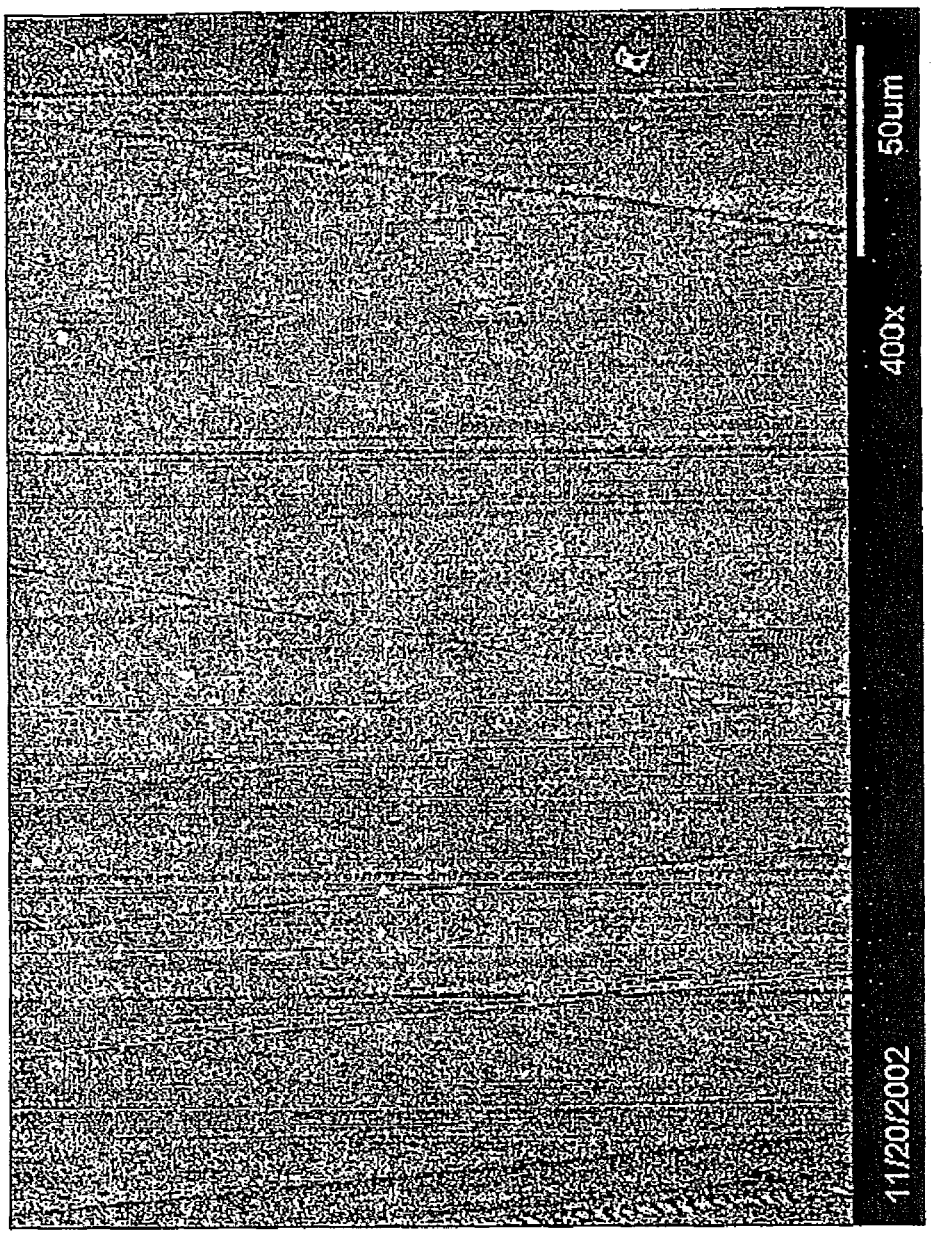
FIG. 2 is a scanning electron microscope picture of the same sample as that shown in FIG. 1 but subject to load of 50 grams.
Figure 3:
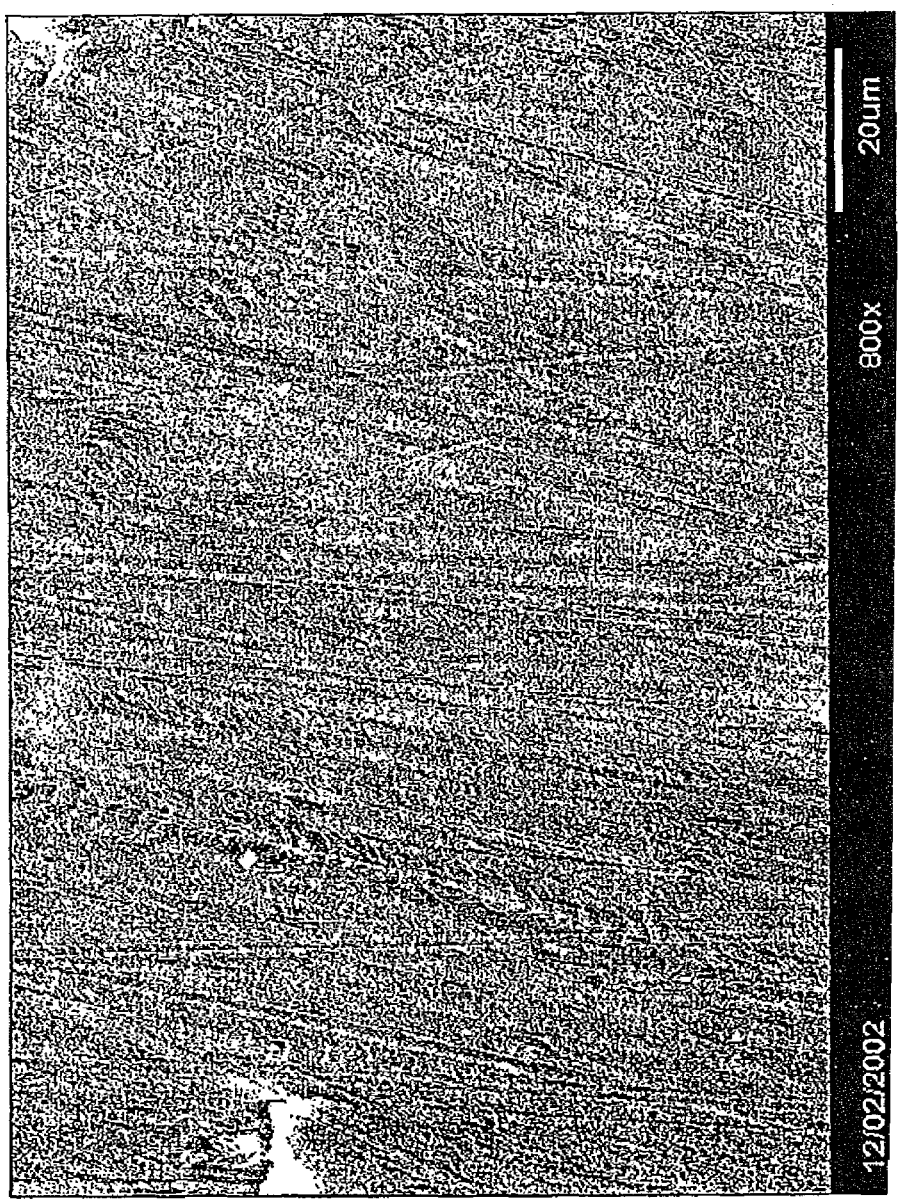
FIG. 3 is a scanning electron microscope picture of a single-layer deposit as detailed in Example 14.

The microstructure of the specimen was examined under the SEM (Scanning Electron Microscope) and the resulting images are shown in FIGS. 1 and 2 for the two-layer specimen (before and after loading, respectively in FIG. 3 (for the one-layer specimen). In addition, the microstructure of the cross-section of the specimen was examined under the SEM after cutting the specimen with a sharp blade. The relics of each individual droplet deposit would be expected to be of the order of 130 µm and accordingly should be visible in the SEM pictures unless the droplets merge together to form a uniform deposit. The microstructures of both samples are homogeneous with neither grain nor patterns being visible at magnifications varying between 250× and 800×, as can be seen from FIGS. 1 to 3. No sign of an imperfect contact between the two layers has been found in the two-layer specimen. The lack of identifiable droplet relics indicates that each droplet stitches together with the adjacent droplets to form a cohesive uniform deposit. This is believed to be due to the slow-curing, low viscosity resin in the composition, which keeps the higher viscosity solvated and mobile while it is being cured. The lower viscosity resin can diffuse between deposited droplets, thereby giving the uniform appearance shown in FIGS. 1 to 3.

A stress-strain analysis provided the results set out in Table 8:

TABLE 8

| | Young's Modulus E (GPa) | Ultimate Tensile Strength (MPa) |
|---|---|---|
| One-layer specimen | 2.4 | 40 |
| Two-layer specimen | 2.73 | 70 |

FIGS. 1 and 3 show the sample unloaded and FIG. 2 shows the sample in an elongated state (load=50 gram). The microstructure is homogeneous even when loaded. It is noticeable that the two-layer specimen has substantially higher ultimate tensile strength properties than the single layer specimen indicating that the two layers are bonding together. Indeed, the ultimate tensile strength properties are nearly the same as that achieved using a comparable moulded sample (Table 6, sample O).

Example 15 Stabilization

An acid inhibitor, BDMA (N-benzyldimethylamine), were added respectively in two typical fluids: O and J. The two fluids were put in an oven at 60° C., and their viscosity was measured at different times. The results are shown in Table 9.

TABLE 9

| | Photoinhibitor | | | Viscosity/cps | | |
|---|---|---|---|---|---|---|
| Fluid | Type | Amount/ ppm | Room Temp. | 70° C./ 48 hours | 60° C./ 1 week | 60° C./ 2 weeks |
| O | None | 0 | 69 | 398 | | |
| O | BDMA | 800 | 69 | 69 | 71 | 118 |
| J | None | 0 | 40 | 76 | | |
| J | BDMA | 170 | 40 | 41 | 50 | 46 |

As can be seen, the compositions are stabilised, as shown by the slower rise in viscosity on storage at elevated temperatures.

The invention claimed is:

1. A curable jettable composition having a viscosity less than 30 cps at a temperature within the range of 15° C.-180° C. comprising:
    (a) at least one low viscosity reactive resin consisting of one or more oxetane compounds, wherein the low viscosity reactive resin has a molecular weight of not greater than 300 Daltons and a viscosity of less than 30 cps at a temperature within the range of 15° C.-180° C.;
    (b) 40%-50% by weight of a high viscosity resin epoxy resin component wherein the epoxy resin component is a cycloaliphatic epoxy resin selected from 3,4-epoxycyclohexylmethyl-3,4-epoxycyclohexane carboxylate and bis-(3,4-epoxycyclohexyl)adipate and wherein the high viscosity resin has a functionality of greater than or equal to 2 and a viscosity greater than twice the viscosity of the low viscosity reactive resin at a temperature within the range of 15° C.-180° C.;
    (c) at least one curable toughener comprising a polymer or oligomer having a hydroxy, or acrylic group;
    (d) at least one initiator;
    (e) at least one stabilizer and optionally
    (f) a vinyl ether curable co-diluent and
    (g) one or more additives
    and wherein the low viscosity reactive resin is slower to react than the high viscosity resin.

2. The jettable composition of claim 1 wherein when 50% of the high viscosity resin has polymerized, less than 10% of the low viscosity reactive resin has polymerized.

3. The jettable composition of claim 1 wherein when 90% of the high viscosity resin has polymerized, less than 75% of the low viscosity resin has polymerized.

4. The jettable composition of claim 1 wherein the low viscosity reactive resin has a viscosity of less than 75% of the viscosity of the high viscosity resin at a jetting temperature ranging between 20° C. and 80° C.

5. The jettable composition of claim 1 wherein the low viscosity reactive resin has a viscosity of less than 50% of the viscosity of the high viscosity resin at a jetting temperature ranging between 20° C. and 80° C.

6. The jettable composition of claim 1 wherein the curable toughener is a functionalized polycaprolactone.

7. The jettable composition of claim 1 wherein the curable toughener is selected from the group consisting of a functionalized poly(tetrahydrofuran), a functionalized dendrimerie polyol, and a functionalized polycaprolactone.

8. A curable jettable composition having a viscosity less than 30 cps at a temperature within the range of 15° C.-180° C. comprising:
   (a) 25% to 80% by weight of at least one low viscosity reactive resin consisting of one or more oxetane compounds, wherein the low viscosity resin has a molecular weight of not greater than 300 Daltons and a viscosity of less than 30 cps at a temperature within the range of 15° C.-180° C.;
   (b) 40% to 50% by weight of a high viscosity epoxy resin component wherein the epoxy resin component is a cycloaliphatic epoxy resin selected from 3,4-epoxycyclohexylmethyl-3,4-epoxycyclohexane carboxylate and bis-(3,4-epoxycyclohexyl)adipate and wherein the high viscosity resin has a functionality of greater than or equal to 2 and a viscosity greater than twice the viscosity of the low viscosity reactive resin at a temperature within the range of 15° C.-180° C.;
   (c) 2% to 25% by weight of at least one curable toughener comprising a polymer or oligomer having a hydroxy, or acrylic group and a functionality of at least 2;
   (d) 0.5% to 10% by weight of at least one initiator;
   (e) 0.02% to 0.5% by weight of at least one stabilizer;
   (f) 0 to 10% by weight of a vinyl ether curable co-diluent; and
   (g) 0 to 25% by weight of one or more additives
   and wherein the low viscosity reactive resin is slower to react than the high viscosity resin.

* * * * *